United States Patent [19]

Kellas et al.

[11] Patent Number: 5,142,616
[45] Date of Patent: Aug. 25, 1992

[54] ELECTRONIC GRAPHIC SYSTEM

[75] Inventors: Paul R. N. Kellas; Anthony D. Searby; Robin A. Cawley, all of Newbury, England

[73] Assignee: Quantel Limited, Newbury, England

[21] Appl. No.: 576,647

[22] Filed: Aug. 31, 1990

[30] Foreign Application Priority Data

Sep. 1, 1989 [GB] United Kingdom ............. 8919852

[51] Int. Cl.⁵ ......................................... G06F 15/62
[52] U.S. Cl. .................................. 395/135; 395/128; 340/734; 340/728; 358/183
[58] Field of Search ............... 364/531, 518; 358/183, 358/22; 340/709, 728, 747, 734; 395/135, 128, 161, 147, 164

[56] References Cited

U.S. PATENT DOCUMENTS

| | | | |
|---|---|---|---|
| 4,514,818 | 4/1985 | Walker | 364/521 |
| 4,602,286 | 7/1986 | Kellar et al. | 358/183 |
| 4,654,484 | 3/1987 | Reiffel et al. | 358/133 X |
| 4,731,743 | 3/1988 | Blancato | 364/521 |
| 4,775,858 | 10/1988 | Stapleton et al. | 340/724 |
| 4,827,253 | 5/1989 | Maltz | 340/734 |
| 4,831,447 | 5/1989 | Lake, Jr. | 358/183 |
| 4,931,956 | 6/1990 | Stapleton | 364/521 |
| 4,954,970 | 9/1990 | Walker et al. | 364/521 |
| 5,003,491 | 3/1991 | Heckt | 364/518 |

FOREIGN PATENT DOCUMENTS

| | | |
|---|---|---|
| 0202014 | 4/1986 | European Pat. Off. |
| 2165728 | 4/1986 | United Kingdom |
| 2207029 | 1/1989 | United Kingdom |

Primary Examiner—Gary V. Harkcom
Assistant Examiner—Raymond J. Bayerl
Attorney, Agent, or Firm—Cooper & Dunham

[57] ABSTRACT

An electronic graphic system is suitable for use in modifying data defining an initial high resolution image. In the system data relating to a user defined low resolution control image controls the combining of other image data with data defining a low resolution representation of the initial image. In this way the system produces data representing a low resolution combined image which is continously displayed on a display monitor. Once desired modifications have been achieved by the user to the image displayed on the display monitor, the low resolution control image data is converted into a high resolution representation. The high resolution control image is used to control the combining of the other image data with the initial high resolution image data to produce data defining a modified high resolution image. The other image data may be a user defined color or another image, for example.

22 Claims, 4 Drawing Sheets

FIG. 1

FIG.2

ELECTRONIC GRAPHIC SYSTEM

FIELD OF THE INVENTION

The invention relates to electronic graphic systems.

BACKGROUND OF THE INVENTION

Electronic graphic or image systems in which the painting or drawing of a color picture can be simulated, or a portion of one image can be merged into another, by electronic means are known. One such graphic system is described in our British patent number 2,089,625 and corresponding U.S. Pat. No. 4,514,818, the teachings of which are incorporated herein by reference. This system includes operator interface means which may be used by the operator to select from a range of colors and a range of intensities and to choose from a set of notional drawing implements for use in the painting or drawing.

The color is chosen by presetting digital signals which represent the components of the selected color, whilst the implement is chosen by selecting from among different implement representations, each representation representing the notional distribution of color which could be made by the implement to the picture points which it covers. The system also includes a touch tablet and stylus combination, which is usually the interface means, for generating position signals designating the position of the stylus relative to the touch tablet. For some implements, representing say paint brushes, position signals are allowed to be generated for each movement of the stylus by the distance between picture points or a similar distance, whilst for other implements, say air brushes, position signals are generated at regular time intervals, even if the stylus is held stationary on the touch tablet.

When a position signal is produced, new video signals (pixels) are derived for every picture point in the patch covered by the selected implement. A picture store is provided and each new pixel is written at the appropriate picture point in the store. Such new pixels are derived by a processing circuit in response to the selected color and the distribution of the selected implement, and in response also—as described in the aforesaid patents—to pressure applied to the stylus and to the value of the pixel previously stored at the respective picture point in the store. The user, who it is envisaged would normally be an artist lacking experience in the use of computer based systems, paints or draws by choosing a desired color and implement and then manipulating the stylus, causing the touch tablet to generate a series of position signals which define the path or positioning of the stylus. The processing circuit derives pixels for a patch of picture points in response to position signals and these pixels are written back to the picture store. To enable the artist to observe this creation, the picture stored is read repeatedly and the pixels are applied to a TV-type color monitor, so that the build-up of the picture can be observed of course such systems are not limited to TV-type formats and any suitable video format may be adopted. The system as described avoids the problem of jaggies, an unpleasant stepping appearance normally associated with lines not lying horizontally or vertically in a raster display.

It is important to the artist that the monitor should display the build-up of the picture virtually in real time, which means in practice that the processing of all the patches of pixels which may be identified by position signals in a frame period should be completed, and the pixels written in the picture store (without interfering with reading from the store to the monitor) also within a frame period, at least when the time is averaged over a few frame periods. The number of pixels to be processed is dependent on the number of picture points required per unit of picture area, that is to say on the resolution of the system; if the resolution is increased, the number of position signals generated for a given movement of stylus, or in a given time interval is also increased, as is the number of pixels in a given brush patch. Real time processing can usually be achieved in systems operating to television standards, including even the high definition standard of 1250 lines per field at 50 fields per second, or 1125 lines/60 fields. Difficulties are however encountered if the higher resolution of print quality pictures, comprising say 4000×5000 picture points, is demanded. Another difficulty is that TV-type monitors for displaying such resolution pictures are not readily available as articles of commerce, and would be very costly if custom built.

To reduce these problems it has previously been proposed that the painting or drawing (hereinafter simply "painting") should be performed with the resolution of commercially available TV-type monitors. One system which adopts this approach, and thus allows for the creation or modification of a picture in accordance with modifications made to a version of the picture displayed on a display screen comprises a converter for converting an initial high resolution image held in a high capacity storage device into a lower resolution representation of the image. The lower resolution image is applied to a framestore which is repeatedly read for display of the image on a color monitor. The system also includes a touch tablet and stylus combination together with a patch address generator, a pixel processing circuit and an intensity or color store, similar to those described in our abovementioned British Patent Number 2,089,625 and corresponding U.S. Pat. No. 4,514,818, by which the artist can select colors and paint on the image. A processing circuit reads image data directly from the framestore, modifies that data in accordance with data generated by the artist painting with the touch tablet, and writes the modified image data back into the framestore for display. This painting is carried out on the low resolution image so that the processing circuit can keep pace with movements of the stylus by the artist and the result can be viewed on the monitor in real time. When the artist finishes painting, either temporarily or finally, the system transfers the modified image data back to the high capacity storage device via an up converting circuit which converts the modified image back to high resolution.

While painting at low resolution allows the artist to observe the results of his action apparently in real time, the down converting of the initial image followed by up conversion inevitably produces a softening of the high resolution picture effectively reducing the resolution of the picture to the lower resolution even though it contains the number of picture points required at high resolution.

In our European patent application no. EP-A-0,202,014 we describe a system in which a high resolution image can be modified by storing high resolution image pixel data in a high resolution framestore and painting new pixel data directly into that framestore by use of a stylus and touch tablet. In order to enable the artist to see the painted modifications as they are made a converter is provided which reduces the number of pixels between the high resolution frame store and a viewing frame store, which is read repeatedly to refresh the monitor display. The converter is arranged such that either a selected area of the high resolution image is transferred to the viewing store and displayed at full resolution on the monitor, or a low resolution representation of the full image is created and fed to the viewing store for display. Whilst this system provides for real time display of the image or part of it, as it is built up in the high resolution frame store, under most circumstances large amounts of silicon memory are required and the build up of the image in the high resolution framestore may still lag behind the stylus movements.

In equipment according to our British patent no. 2,089,625, as currently manufactured and sold, additional means are provided which allow the system to be configured to perform picture composition in addition to painting. Some configurations which allow composition are described in our British patent no. 113,950 and in corresponding U.S. Pat. No. 4,602,286, the teachings of which are also incorporated herein by reference. In such configuration, storage means are provided having the capacity to store two independent pictures, termed herein as the foreground image and the background image respectively, and a further image which is termed the control image or stencil. The control image, like the foreground and background images, can be created by the artist, using the system in a painting mode. The control image usually comprises areas of pixels having a maximum value which represents opacity and a minimum value which represents transparency and is created so that in effect it masks a selected part of the foreground image while exposing the remainder. The control image is defined by eight bits and during creation can be displayed as a single color superimposed on the foreground picture. First address means are moreover provided for reading the pixels of the foreground image and the control image in parallel from the respective parts of the storage means and applying them to a linear interpolating circuit, which is rendered operational during an image preview mode and during an image composition mode. A second address means provides the pixels in the background image also to the two interpolating means concomitantly with the reading of the foreground image pixels and the control image pixels.

The first address means is connected to a manipulator which, under stylus control or the control of other user operable means, can change the order of reading the foreground pixels and control pixels relative to the background pixels so as to effect a spatial transformation of the foreground and stencil relative to the background. Whilst the system is in preview mode, the artist can manipulate the stylus or other control means to effect a series of desired transformations such as zoom, pan, scroll, rotate, and change perspective. During a frame period the foreground image pixels in transformed order and the background image pixels are applied to the input of the first interpolating means whilst the control image is applied to a control input to act as a pixel-by-pixel interpolating coefficient. The output of the interpolating means is applied to the picture monitor and displayed, but without affecting any of the pictures as stored. The interpolation has the effect of causing the display to represent the foreground image where the control image is opaque and to represent the background image where the control image is transparent, simulating the pasting or overlaying of part in the foreground image on the background. Using the stylus or control means to vary the spatial transformation, the artist can try various positions of the insert onto the background image from the foreground image until he perceives a desired transformation. Thereupon the artist, by producing a predetermined "stick" command, switches the system to the composition mode. The foreground image pixels and background image pixels are then read to the second interpolating means and interpolated under control of the control image pixels, the foreground image and control image pixels being read in the transformation order prescribed in the last try during the preview mode. In addition, in composition mode the output of the interpolating means is read back to the storage means for the background image and produces a permanent change in that image, which simulates pasting part of the foreground on the background.

The particular composition process described in the preceding paragraph is merely illustrative and many variations of the process are possible. However it is to be noted that the difficulties in achieving real time display of the artists work during composition, and in particular during preview, can be even more acute than during painting. During preview the artist in effect attaches part of the foreground image which is to be stuck down to the point of the stylus and moves it around as seen on the monitor until he finds a desired displacement. The number of pixels to be processed for each transformation may be very much larger than for any brush stamp, and the processing needed to achieve the transformation for each pixel to be transformed can be complex especially as equations for evaluating changes in pixel addresses may be involved. Therefore it can be difficult to achieve real time operation during preview and this will severely interfere with the artists creative processes. It has also been proposed to reduce the number of pixels for which processing is required by confining the processing to pixels lying within a computer-generated boundary enclosing little more than the part of the foreground image to be stuck down, but even so real time working is unlikely to be achievable in many cases at the higher resolutions envisaged.

OBJECTS AND STATEMENTS OF THE INVENTION

The present invention aims to provide a system by which high resolution image manipulation is possible without a discernable lag between actions performed by an operator and the resulting effect of those actions being seen on a display.

According to one aspect of the invention there is provided an electronic graphic system for use in modifying data defining an initial high resolution image, in which system data relating to a user defined low resolution control image controls the combining of other image data with data defining a low resolution representation of the initial image to produce data representing a low resolution combined image which is continuously displayed on a display monitor, and, once desired modifications have been achieved by the user to the image displayed on the display monitor, the low resolution control image data is converted into a high resolution representation thereof which is used to control the combining of the said other image with the initial high resolution image data to produce data defining a modified high resolution image.

Thus the invention in one aspect provides a high resolution graphic system which allows the initial high resolution image to be touched up by a relatively low resolution painting system in such a way that only the added paint is at low resolution or soft with untouched features of the initial image retaining their original high resolution or sharpness. In this sense the primary purpose of the control image is to delimit the area of the picture which is touched by the paint.

As will become clear from the detailed description of preferred embodiments of the invention which follow hereinafter, in the practice of the invention as exemplified by the embodiments an original high resolution color image of say 4000×5000 pixels stored in a high capacity storage device, for example a disc storage device or digital video tape recorder, is down converted to produce a low resolution representation of the original high resolution image. The low resolution image is applied to a viewing framestore of say 1920×1035 pixels and the contents of the viewing framestore can be repeatedly read non-destructively for display on a conventional color TV monitor for example, subject to such modification as may be produced by combination with other image data.

User operable control means are preferably provided for use in effecting said modifications, which control means comprises input means arranged to convert a drawing action of the user into data representative of said action, which data is used to modify the control image as previously stored and combining means for combining said low resolution representation of said initial image with said other image data in accordance with said low resolution control image data to produce said low resolution combined image data for display.

Preferably the combining means comprises a linear interpolator arranged to be responsive to the control image data as a coefficient in the interpolation of the low resolution representation of said initial image data and the other image data.

In the above mentioned aspect of the invention, the said other image date may be data defining another high resolution image, a low resolution representation of which is combined with said low resolution representation of the initial image during preview, or it may be user defined color data. Thus, in the practice of the invention by embodiments hereinafter described means may be provided to allow the artist to select the image information which is to be combined with the original image by the user drawing with the drawing implement. This selectable image information may be a single color selected from a palette of colors available in the system or it may itself be composed of a further image or a portion of an image extracted from an image store.

Means can also be provided in the embodiments of the invention for converting the image data to be displayed from data defined in terms of subtractive cyan, magenta and yellow (CMY) components to data defined in terms of additive red, green and blue (RGB) components. RGB components form the basis of visual display images such as those shown on color TV monitors, whereas CMY components normally form the basis of printed images and by providing means for converting between CYM and RGB the image data to be displayed can be readily controlled to allow the user to view the correctly colored image regardless of whether the original image data is stored in RGB or CYM format.

The systems embodying the invention allow the user to experiment, if so desired, by manipulating the displayed image in real time without affecting in any way the low resolution original image held in the viewing framestore and of course without affecting the original high resolution image held in the disc storage device. There is therefore no danger of the user inadvertently making a destructive modification to the original high resolution image.

In one of the preferred embodiments of the invention, as will be described in greater detail hereinafter, the system can be used to add for example a color wash to portions of the original image selected by the control image by arranging for the combination of a single color to the selected parts of displayed image. By selecting the color to be added to the displayed image and then drawing at low color intensity on the image using the stylus on the tablet, the desired color wash effect can be obtained in the original image. By increasing the applied color intensity by increasing the pressure on the drawing implement the user can overdraw and replace portions of the original image with the drawing implement.

In the other of the preferred embodiments of the invention, as will also be described in greater detail hereinafter, the system can be used to combine portions of another image with the original image. By varying the transparency of the control image or stencil by increasing the pressure on the drawing implement, selected portions of the other image may be transparently overlaid on the original image or may replace portions of the original image.

The invention can also provide for the modification of the original high resolution image in accordance with modifications shown on the displayed image once the user has finished making modifications to that image. To this end, means are provided for up converting the low resolution control image data held in the stencil framestore to a resolution equal to that of the original high resolution image held in the disc storage device. The up converted stencil data is used as a high resolution weighting factor or interpolation coefficient in a once only linear interpolation. In the first preferred embodiment of the invention, the high resolution image data is read out from the storage device and modified by combining it with the user selectable color data under the control of the up converted high resolution control image, and the resulting combined image is then written back into the storage device.

In the other preferred embodiment of the invention, the high resolution initial image data and other image data are both read out from the storage device and the initial image is modified by combining it with the other image data, and the resulting combined image is written back into the storage device. The high resolution combined image can subsequently be read from the storage device and used in the control of any suitable high resolution printing apparatus.

The user operable control means may further comprise low resolution transforming means for spatially transforming said low resolution other image data and said low resolution control image data relative to said low resolution first image data. A corresponding high resolution transforming means for spatially transforming said high resolution other image data and said high resolution control image data relative to said high resolution first image data should also be provided for enabling corresponding transformations to be performed on the high resolution image or images.

In another of its aspects the present invention provides an electronic graphic system comprising first storage means having the capacity to store first pixel data defining an image of high resolution, down converting means for deriving second pixel data from said first pixel data and defining said image with a lower resolution, and second storage means having the capacity to store said second pixel data, characterised by: control input means for providing third pixel data defining a control image of said lower resolution; user operable means responsive to said third pixel data for deriving a series of trial image compositions including at least pixel data derived from said second storage means; means for displaying said trial compositions as they are derived; up converting means for deriving fourth pixel data from said third pixel data to define said control image with said high resolution; image composition means responsive to said fourth pixel data for deriving an image composition including at least pixel data derived from said first storage means and corresponding to a selected one of said trial image compositions.

This aspect of the invention is based on the concept of confining up conversion to the control image and using it to control the processing of one or more high resolution pictures. The processing is not therefore carried out on low resolution pictures. The up conversion of the control image may have the effect of softening transients in the control image, and this may also soften result edges or transients in the final picture. Moreover the control image will often comprise substantial areas of uniform value which will not suffer from up conversion and will have no noticeable effect on the resolution of the controlled picture of pictures.

The invention also provides a method of electronically processing an initial high resolution image to produce a modified high resolution image, in which method data relating to a user defined low resolution control image controls the combining of other image data with data defining a low resolution representation of the initial image to produce data representing a low resolution combined image for display on a display monitor, and, once the desired modifications have been achieved by the user to the image for display on the display monitor, the low resolution control image data is converted into a high resolution representation thereof and is used to control the combining of the said other image data with the initial high resolution image data thereby to produce said modified high resolution image.

Further features and advantages of the invention will also become apparent to those possessed of the relevant skills from the detailed description hereinbelow of preferred embodiments of the invention.

BRIEF DESCRIPTION OF THE DRAWINGS

In order that the invention may be better understood exemplary embodiments will be described with reference to the accompanying drawings, in which.

DETAILED DESCRIPTION OF THE EMBODIMENTS

Figure 1:
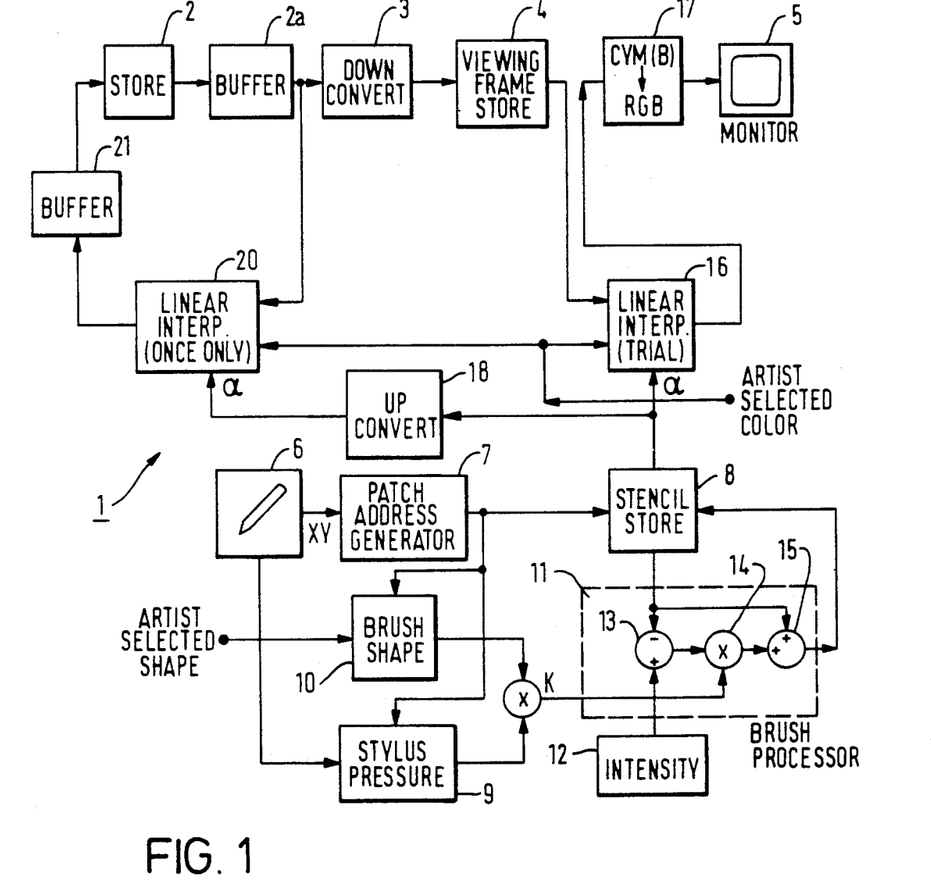
FIG. 1 is a schematic block diagram representing one preferred embodiment of the electronic graphic system.

Referring now to FIG. 1 of the accompanying drawings, a first embodiment of an electronic graphic system 1 shown therein includes a high capacity storage device 2, which may for example be a FUJITSU disc pack or a SONY digital videotape recorder, or any other suitable high capacity storage device, for resolution image to be processed by the system 1 under the control of a user. The high capacity storage device 2 can be used to store pixel data for a large number of different high resolution images and provides for rapid access by the system to the pixel data for any one of these images. To simplify the explanation of the embodiments, the pixel data representing the images will hereinafter be referred to in terms of the image which that pixel data represents and in reading the following it should therefore be remembered that references to an image in fact refer to the pixel data representing that image.

Typically the images held in the high capacity storage device 2 will have a resolution suitable for high quality color printing or the like, for example a resolution requiring say $4000 \times 5000$ pixels or $8000 \times 10000$ pixels for a picture, of say 25 cm $\times$ 25 cm in size. However, it should be appreciated that the invention is not limited to such resolutions or picture size and other high resolutions and sizes for use in providing pictures of a desired quality might be adopted.

Image data is stored in the storage device 2 in a format determined by the manufacturer of that device. Thus, for example, image data may be stored in a high capacity storage device in byte parallel, bit serial format or it may be stored in a digital tape recorder in YCRCB format. However, whatever format the image data is held in the storage device 2 the system will normally be designed to work in byte serial, bit parallel format and buffer 2a is provided for converting the extracted image data into the correct format for use in the system.

Different stages of the system operate at different rates and in different data forms. In order to ensure that the data is passed satisfactorily between the different stages, buffers, such as buffer 2a discussed hereinabove, under the control of a controlling subsystem (not shown in FIG. 1) are also provided to facilitate the transfer of image data about the system.

In use, an initial image is extracted from the storage device 2 via buffer 2a and a lower resolution image is derived by down converting circuitry 3 for storage in a viewing framestore 4 and display on a color display monitor 5. The down converting circuitry 3 derives an image of say $1920 \times 1035$ pixels from the image in the storage device 2 thus reducing the resolution to that compatible with a display monitor of 1125 lines at 60 frames per second or 1250 lines at 50 frames per second. The low resolution image data (hereinafter referred to as the viewing image) in the viewing framestore 4 is read serially from the framestore 4 in raster sequence under the control of the serial address generator for display on the monitor 5.

The down converter circuitry 3 comprises a two dimensional spatial filter which filters the original high resolution image to reduce the amount of information in the image so that the reduced resolution image can be stored as the viewing image in the viewing framestore 4.

Using a spatial filter in the down converter circuitry 3 maintains the integrity of the original image in the viewing image and accordingly the viewing image will be a good representation of the original image.

The system 1 as shown in FIG. 1 also includes a stylus/touch tablet device 6 by which the artist may modify the displayed image shown on the monitor 5. As the stylus is drawn across the tablet by the artist a number of signals are output from the device. Signals XY representative of the instantaneous position of the stylus on the tablet are output to a patch address generator 7. The patch address generator 7 converts the XY co-ordinate information from the tablet into corresponding location, i.e. picture points, addresses in a stencil framestore 8 the purpose of which will be described in greater detail hereinafter.

Stylus/touch tablet devices normally provide coordinate information at a much higher resolution than that of the stencil framestore (which is the same as the resolution of the viewing framestore 4, namely 1920×1035 pixels) and the patch address generator is arranged to convert each XY co-ordinate pair from the touch tablet to the corresponding address in the stencil framestore. Notional drawing implements are used to draw images into the stencil framestore 8 and the system may be arranged such that after each update of the framestore incremental movements of the stylus over the touch tablet are integrated until they exceed one picture point or similar spacing and then the framestore is again updated by stamping a modified patch of pixels in the stencil framestore 4. A signal representing the instantaneous pressure of the stylus on the touch tablet is also delivered to a stylus pressure register 9.

As in the systems described in our abovementioned patents, a set of artist selectable notional drawing implements are each stored in a brush shape memory 10. The implements can be stored as a numerical representation of a continuous three dimensional shape which covers a patch of image pixels or as a mathematical expression representing the profile of the implement. The address signal output from the patch address generator 7 is also used to synchronise addressing of the stylus pressure register 9 and the brush shape memory 10. Selection means (not shown in FIG. 1) are provided to allow the artist to select one of the drawing implements from the set. The selection means for example may be a thumbwheel arrangement which the user can turn to select the chosen implement, or a menu driven arrangement displayed on the monitor 5.

The manner in which position signals from the touch tablet 6 are generated will depend upon the particular notional drawing implement selected by the artist. For example where the selected implement is say a paint brush, position signals are generated only when the integrated stylus movement is for instance the distance between picture points as above described, whilst for say an airbrush position signals are generated at regular time intervals, even if the stylus is held stationary on the touch tablet.

In use data output from the stylus pressure register 9 and the brush shape memory 10 as the artist moves the stylus across the touch table are multiplied together to produce an interpolation coefficient K for use by a brush processor circuit 11.

The brush processor circuit 11 performs a continuously cycling read-modify-write operation on the stencil or control image data in the stencil framestore 8 on a pixel by pixel basis. Control image data is extracted from the stencil framestore 8 and is negatively summed with, i.e. subtracted from, a preset image colour or intensity value held in an intensity register 12 by a summing unit 13 (e.g. a 74S381 device). The resulting sum output from the summing unit 13 is multiplied with the coefficient K by way of a multiplying unit 14 (e.g. a MPY-8HuJ/TRW device) and the resulting product is then added to the data extracted from the stencil framestore 8 by way of an adding unit 15 (e.g. a 74S38i device). The data output from the adding unit is then written back into the stencil framestore 8, replacing the original data in the stencil framestore 8.

The process performed by the brush processor can be expressed in a mathematical algorithm for each picture point of each brush patch as follows, namely:

$$S_i = IK + S_{i-1}(1-K)$$

where
$S_i$ = new stencil data stored in stencil framestore
$S_{i-1}$ = previous stencil data stored in pencil framestore
I = present intensity value
K = Interpolation coefficient $\leq 1$.

Although the read-modify-write process is executed in a continuous cycle on the data held in the stencil framestore, it should be apparent from the above algorithm that the stencil data will only be modified when $K > 0$, i.e. when the artist is drawing on the touch tablet with the stylus. K is the product of brush shape and stylus pressure and when the artist is not using the stylus/touch tablet device under pressure the stencil data in the stencil framestore 8 will remain unaltered and no read-modify-write cycles are performed.

The degree of modification of the stencil data depends substantially on the brush shape, which it will be recalled is predefined in the brush shape memory as a continuous three dimensional shape, and on the instantaneous stylus pressure. It should be appreciated that each time a picture point in the predefined brush shape notionally moves over a new pixel in the stencil store 8, the value of the control image pixel is recalculated by the brush processor 11. Thus, where only the edge of the brush shape moves over a particular control image pixel, the value of K will be relatively low. In contrast, for the case where the center of the brush shape moves over a particular control image pixel, the contribution to that pixel from the brush will start at a relatively low value of K at the forward edge of the brush shape, will increase to a high value of K at the center of the brush shape, and will then decrease to a low value of K at the trailing edge of the brush. Thus, in this latter case the total summed contribution of the brush to the control image pixel will be more substantial than in the previous case. This method of processing data drawn into the stencil framestore avoids the problem of stepped edges by producing non-stepped stencil boundary profiles.

Colors are defined in the system using one byte (8 bits) to define the red component of the color, one byte to define the green component of the color and one byte to define the blue component, or alternatively one byte for each CYM component. Thus, at least 24 bits are used to define the color of each pixel. The stencil need however only be monochrome, because it will be the same for each color component and thus can be used simultaneously or repeatedly to control the combining of each of the three color components of the image with the respective color components of the artist selected color data. Since the stencil is monochrome, only eight bits are sufficient for each pixel of the stencil. In this regard it should be noted that although only single lines have been shown connecting the various parts of the system to each other there are in most cases a number of parallel lines providing the appropriate connections as will be apparent to those possessed of the relevant skills.

The stencil, or control image, in the stencil framestore 8 is used to define an area of the image in which the artist wishes to effect a desired modification. In the case illustrated, an artist selected color is used to retouch areas in the initial image defined by the stencil as drawn by the user by manipulating the stylus on the touch tablet. During creation of the stencil, the system may be arranged such that the artist selected color data is used directly by the interpolator 16 under the control of the stencil data to change, ie. retouch, the displayed image. Thus, changes in the image can be seen by the user as they are created by causing the artist-defined color data to merge with the viewing data in the interpolator 16. Alternatively, the system 1 can be configured to display a representation of the stencil as it is drawn. This can be achieved by causing the stencil values written in the stencil store to be used as the interpolating coefficient for only one of the color components, say red, in the viewing frame store 4, thus causing the stencil to be displayed as a red overlay on the displayed image The addressing of the stencil framestore 8 is synchronised to the addressing of the viewing framestore 4 so that pixels at corresponding locations in the two framestores are read from the two framestores at the same time. Image data from the viewing framestore is input to a linear interpolation circuit or linear interpolator 16.

Means (not shown in FIG. 1) are also provided which enable the artist to select a color value from a palette of colors available in the system. The artist selected color is also input to the linear interpolator 16. The linear interpolator 16 interpolates the viewing image and the artist selected color such that they are selectively merged or combined. The stencil data in the stencil framestore 8 is used on a pixel-by-pixel basis as an interpolation coefficient $\alpha$ which determines the contribution from the viewing image and from the artist selected color to the resulting merged image displayed on the monitor 5.

In its simplest form the process performed by the linear interpolator 16 can be regarded as the addition of a weighted artist selected color, the weight being determined by the value of the interpolation coefficient $\alpha$ as defined by the values of pixels in the stencil framestore, to the viewing image. Thus, for low interpolation coefficient $\alpha$ values the contribution from the artist selected color to the displayed image will be small, whereas, for high coefficient values the contribution will be greater.

The contents of the stencil framestore 8 and the viewing framestore 4 are thus kept separate from each other at all times. The data in these framestores are read out and the viewing image data combined with artist defined color data by the linear interpolator 16 under the control of the stencil data for display on the display monitor 5. Therefore, the artist is free to experiment with the form of the stencil that is drawn into the stencil framestore 8 and the color that is selected for combination in the displayed image without altering the viewing image held in the viewing framestore 4.

An optional feature of the system is a color conversion circuit 17 which converts the image data output from the linear interpolator 16 from subtractive cyan, yellow, magenta (CYM)—or in certain applications cyan, yellow, magenta, black (CYMB) signals—as normally used in graphic systems where the image is to be printed using CYM or CYMB inks or the like, to additive red, green, blue (RGB) signals, as normally used in graphic systems where the image is to be displayed using a color monitor. The provision of this conversion circuit 17 allows for greater flexibility in the format of the original image, i.e. an RGB formatted or a CYM(B) formatted image can be operated on by the system 1 and displayed in the correct colors for the image on the display monitor 5. Of course, in the case where the original image data is held in the storage device 2 in the form of RGB data, there will be no need to convert the data for display on the monitor 5. However in this case, once the desired modified image is ready to be printed a conversion circuit such as the conversion circuit 17 can be employed at high resolution to convert the image data from RGB video format into the required CYM or CYMB printing format. Our own color conversion circuit, as described in our European patent application published as EP-A-2,245,943 the teachings of which are incorporated herein by reference, is particularly suited to this task.

The parts of the system described so far including the interpolator 16 all work at the relatively low resolution of the monitor 5 and this enables the artist to work in real-time with the system configured in a preview mode. That is to say, the artist can preview the work as it is drawn or composed using the stylus/touch tablet device. The control data is processed and drawn into the stencil framestore which influences the combination of the artist selected color and the viewing image, and the resulting modified image is displayed on the monitor with no discernable delay. Thus, the parts of the system described so far are arranged so that the artist's drawings can be previewed in real-time.

Once a modified image satisfactory to the user has been achieved, the original high resolution image held in the storage device 2 can be altered in accordance with the displayed image if the artist so desires. The system is reconfigured into a composition mode in which the original high resolution image is modified under the control of an up conversion high resolution representation of the control image held in the low resolution stencil store 8 by the execution of a predefined command by the artist. The control image data, i.e. the interpolation coefficient $\alpha$, held in the stencil store is passed to an up converter 18 which performs the opposite operation to that of the down converter 3. That is to say, the control image data is converted from the low resolution of 1920×1035 pixels to the high resolution of say 4000×5000 pixels. This low to high resolution up conversion is achieved in the up converter 18 by use of any suitable known technique which maps a single pixel onto a corresponding group of pixels or maps a small number of low resolution pixels onto a corresponding larger number of high resolution pixels whilst maintaining the integrity of the control image.

Up conversion of the control image may have the effect of softening edges and other transients in the control edges by causing those transients to be spatially extended over a larger number of pixels. This may also result in a softening of edges and other transients in the final combined high resolution picture.

With the system configured in its composition mode the original high resolution image data is read from the storage device 2 through the buffer 2a to be input together with the user selected color data to a high resolution linear interpolator 20. The high resolution linear interpolator 20 performs a once only interpolation on the high resolution image data and the selected color data under the control of the up converted control image data. The operation of the linear interpolator 20 is in many respects similar to that of the previously described linear interpolator 16, the main difference being that the interpolation process is performed using high resolution data.

The resulting modified high resolution image data output from the linear interpolator 20 is written back into the storage device via a buffer 21 where it is stored for subsequent use. The buffer 21 performs the reverse operation to that of buffer 2a. That is to say, the buffer 21 is arranged to convert the incoming high resolution image data from byte serial, bit parallel format to byte parallel, bit serial format for storage in the store device 2. Such subsequent use may for example be the printing of the modified high resolution image, or further processing say with different user defined colors by the system shown in FIG. 1. It will, of course, be appreciated that storing the modified high resolution image in the high capacity storage device 5 need not result in the destruction of the original image although normally the system will be arranged to overwrite the original image with the modified image in order to avoid an undue number of different versions of the original image being stored in the storage device.

Thus, the above described embodiment of the system provides an arrangement by which an original high resolution image can be displayed on a lower resolution color monitor and the displayed image can be modified as required in real time by a user when the system is configured in a preview mode, and the original image can be subsequently modified in accordance with the displayed image by up converting the control image data and using the up converted control image data to control said modification when the system is configured in a composition mode.

Additionally, the system 1 may be used to modify the original high resolution image data held in the storage device 2 in order to remove flaws, blemishes or other imperfections from the original image. By using a stencil having non-stepped boundary profiles, the final combined i.e. modified image will include contributions from both the original viewing image and the artist defined color data and this will result in a more visually pleasing final image. This merging process will now be described in greater detail with reference to FIG. 2 of the accompanying drawings.

Figure 2:
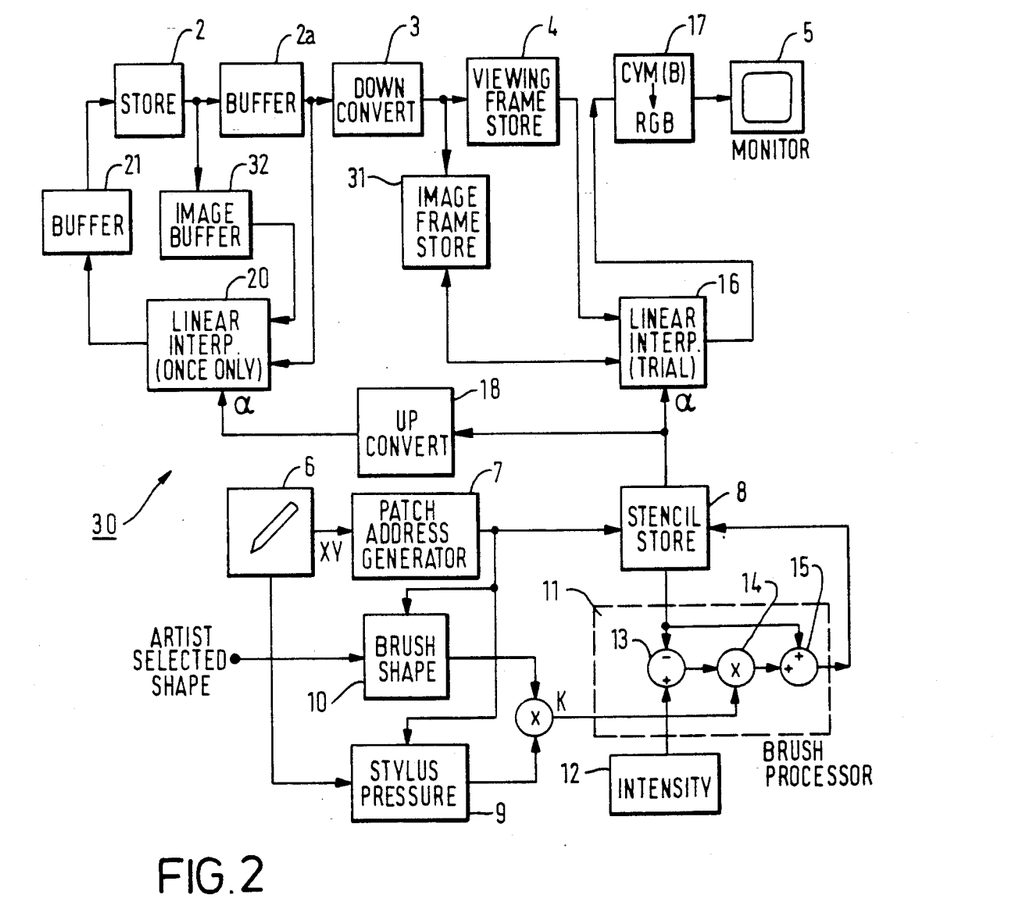
FIG. 2 is a schematic block diagram representing another preferred embodiment of the electronic graphic system.

Turning now to FIG. 2 of the accompanying drawings, there is shown a second embodiment of a graphic system 30. In many respects this second system 30 is similar to the above described system 1 and the following description will be directed toward those features of the second system 30 that differ from the first system 1. A first high resolution image, that is to say the initial image or image to be modified, which as may become clear from the following description can be regarded as a background image, is extracted from the storage device 2 via buffer 2a and down converted by the down converting circuitry 3 to form a low resolution representation of the original or background image. The thus down converted first image is stored in the viewing framestore 4 for display on the display monitor 5. A second high resolution image, that is to say the image which will be used to modify the original image and which can be regarded as a foreground image, is also extracted from the storage device 2 and down converted by the down converting circuitry 3. This down converted, i.e. low resolution, foreground image is stored in an image framestore 31.

Control image data, drawn into the stencil framestore 8 in the same manner as that described hereinabove in relation to the first system 1, is used to control the linear interpolator 16 which combines image data on a pixel-by-pixel basis from the viewing framestore 4 and the image framestore 31. The linear interpolator 16 interpolates the first or background image and the second or foreground image such that they are selectively merged or combined, with the control image data in the stencil framestore being used as the interpolation coefficient $\alpha$. That is to say, the foreground image data is weighted by the interpolation coefficient o as defined on a pixel-by-pixel basis by the control image data and is added to the background image data. Again, low interpolation coefficient $\alpha$ values will result in a small contribution from the foreground image and high coefficient values will result in a greater contribution. The resulting combined image output from the linear interpolator 16 is displayed on the monitor 5 after conversion to RGB format should such conversion be required.

As in the above described system 1, the contents of the framestores 4, 8, 31 are kept separate from each other at all times and the user is free to experiment with the form of the control image that is drawn into the stencil framestore 8, and accordingly with the resulting combined image, without affecting the images held in the viewing and image framestores 4, 31. By using low interpolation coefficients, effects such as ghosting of the selected second image portions on the first image can be achieved in the resulting combined image. By using high interpolation coefficients, the reverse effect, or alternatively a complete overlay or patching in of the selected second image portions in the first image, may be achieved.

It will be appreciated that in most situations the artist will wish to effect spatial changes to the foreground image before it is combined with the background image. Such spatial changes to the foreground image may include transformations such as zoom, pan, scroll, rotate and change perspective. To this end an image manipulation sub-system is provided as part of the system 30. When the system 30 is configured in its preview mode, i.e. when low resolution images are being displayed on the monitor 5, an image manipulation sub-system such as that shown in FIG. 3 of the accompanying drawings may be rendered operable by for example the artist selecting a predefined command from a display menu.

Figure 3:
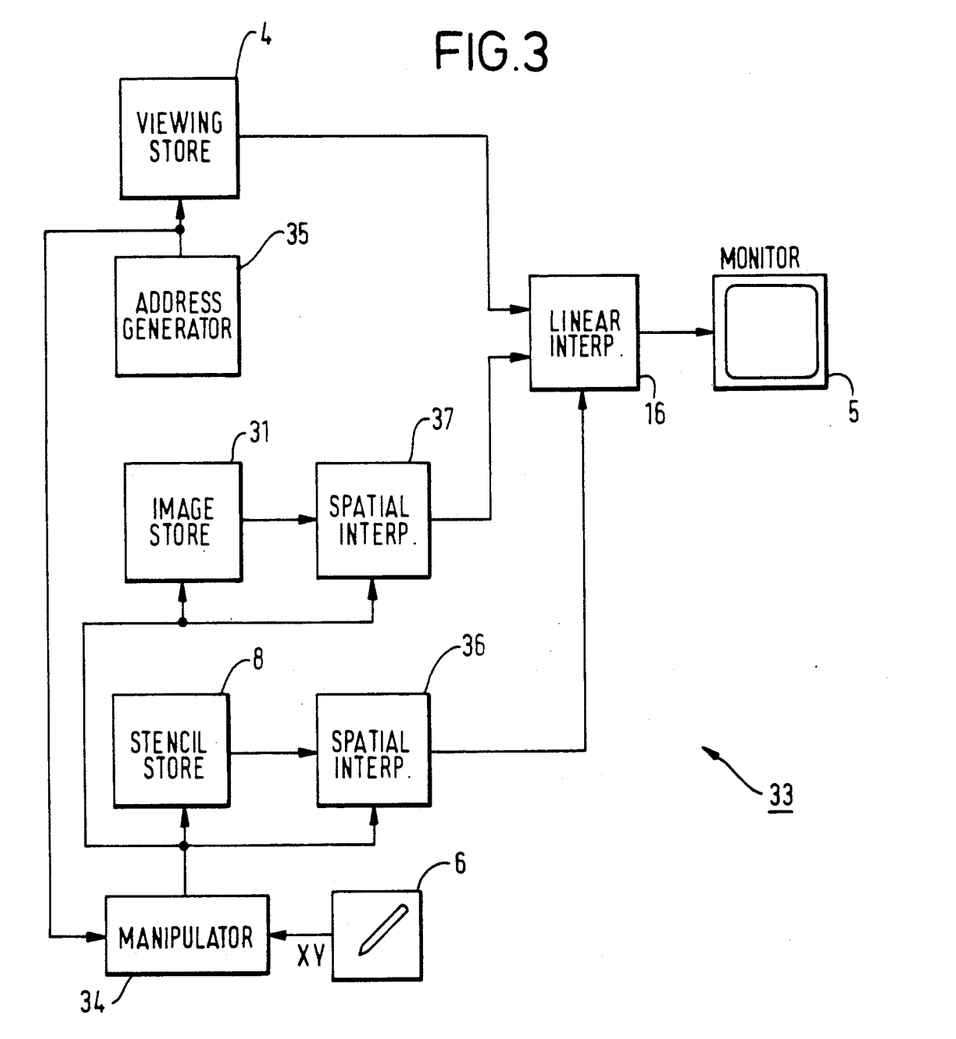
FIG. 3 is a schematic block diagram representing an image manipulation sub-system of the graphic system when configured in a preview mode.

As can be seen from FIG. 3, the image manipulation sub-system, generally indicated at 33 comprises a manipulator 34 which operates under the control of the stylus/touch tablet 6 or any other user operable controlling means to effect spatial transformations, such as the above mentioned zoom, pan, scroll, rotate and change perspective, to both the foreground image held in the image store 31 and the control image held in the stencil store 8. An address generator 35 is coupled to the viewing store 4 and controls the extraction of the background image from the viewing store 4 for display via the linear interpolator 16 on the monitor 5. The address generator 35 also delivers generated address data to the manipulator 34 which performs spatial transformations on the address data and delivers a corresponding transformed address both to the image store 31 which contains the foreground image and to the stencil store 8 which contains the control image drawn by the artist. The manipulator 34 may be implemented as an arithmetic circuit defining artist selectable transformations by which transformed addresses can be derived from the addresses from the address generator. The calculations involved in many of the transformations are not trivial and are repeated for each pixel in the transformed output. Hitherto, foreground image manipulation has only been achievable in real time where restrictions are placed on the displayed pixels making up the foreground image as it is moved around on the display monitor by the artist. An improved manipulator which mitigates this problem is disclosed in our co-pending British patent application no 9013192.1 and corresponding U.S. application Ser. No. 534,713 (U.S. Pat. No. 5,077,610). This improved manipulator comprises an arithmetic unit which is controlled to perform reduced transformations to only some of the incoming addresses, for example every other address, when the foreground image is being moved around on the display screen and to perform full transformations, that is to say transformations on all incoming addresses, at other times, such as when the artist stops moving the foreground image. The manipulator 34 in the drawings can be based on the above discussed improved manipulator.

Thus, the manipulator 34 is arranged to change the order in which the stencil store and the image store are addressed relative to the addressing of the viewing store in order to effect the desired spatial transformations to the foreground image data and the control image data relative to the background image. In general the address derived by the manipulator 34 will not correspond exactly with an integer address in the stencil store 8 and image store 31 and will instead consist of an integer value and a fraction value. The integer and fraction values can be used to identify the nearest group of pixel addresses in each of the stores. These groups of pixel data are output from the stencil store 8 and the image store 31 to respective spatial interpolators 36, 37. The spatial interpolators 36, 37 each perform a spatial interpolation on the pixel groups delivered from the respective store to derive a representative single pixel value which is output to the linear interpolator 16.

The linear interpolator 16 also receives background image data from the viewing store 4 and combines the transformed foreground image data from the spatial interpolator 37 associated with the image store 31 with the background image data on a pixel-by-pixel basis in accordance with the transformed control image data from the spatial interpolator 36 associated with the stencil store 8.

The contents of the viewing store 4, the stencil store 8 and the image store 31 are kept separate at all times and the contents of these stores are read cyclically and combined for display on the monitor 5. Thus, the combined image displayed on the monitor 5 provides for a representation of the combined contents of the stores in real time. Accordingly, manipulation of the control image and the foreground image by the artist will be displayed apparently instantaneously on the display with the system configured in the preview mode.

In this way, the system in preview mode appears to the artist to be operating as if the foreground image is attached to the end of the stylus. The foreground image moves around over the background image on the display screen in real time as the stylus is moved around on the touch tablet.

Once the resulting combined image as displayed on the monitor 5 is acceptable to the user, the high resolution images held in the storage device 2 can be extracted for combination. Returning for the moment to FIG. 2 of the drawings, in the case where the two images are to be combined simply by overlaying one image on the other in accordance with the control image data, the two images can be extracted from the storage device via the respective view buffer 2a and image buffer 32 and combined by the high resolution linear interpolator 20. Again, a high resolution version of the stencil or control image, up converted by the up converting circuitry 18, is used as the interpolation coefficient by the linear interpolator 20 which may result in a softening of edges between the two images. The resulting high resolution combined image is delivered via buffer 21 to the storage device 2 for storage therein.

Figure 4:
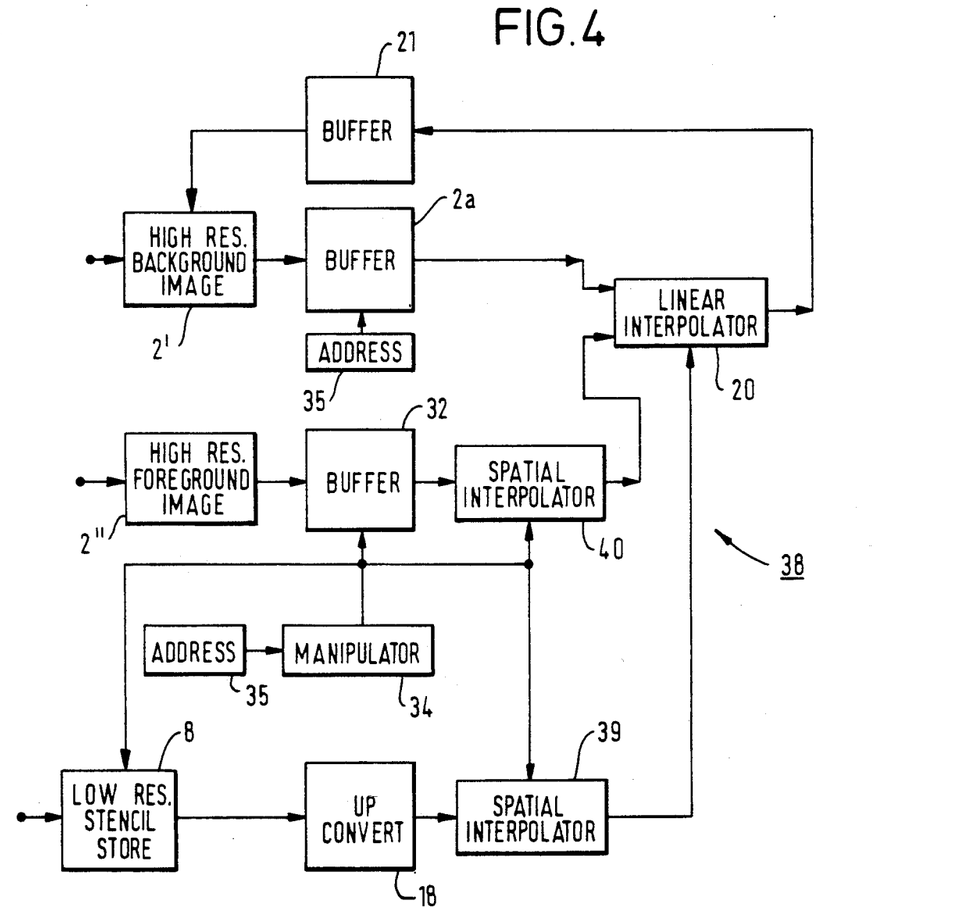
FIG. 4 is a schematic block diagram representing an image manipulation sub-system of the graphic system when configured in a composition mode.

However, in the case where the foreground image and the control image have been transformed by the operator by way of the manipulator 34 an alternative arrangement, such as the arrangement illustrated in FIG. 4 of the drawings, may be used when the system is in a composition mode to combine correctly the two high resolution images.

Once the desired effect has been reached by use of the sub-system 33 of FIG. 3 the artist can instruct the system to combine the images at high resolution. This may be achieved by, for example, the artist selecting a composition command from a menu on the monitor which command causes parts of the system to be reconfigured to the arrangement shown in FIG. 4.

As can be seen from FIG. 4 a high resolution image manipulation sub-system, generally indicated at 38, is arranged to combine the high resolution background image in the storage device, represented by box 2', and the high resolution foreground image in the storage device, represented by box 2'', in accordance with the transformation parameters defined by the manipulator 34. The address generator 35 generates address data at high resolution, the address data being used to control buffer 2a for the extraction of the high resolution background image 2' and to control the manipulator 34. The manipulator 34 performs spatial transformations on the high resolution address data in accordance with the transformation parameters previously defined and held in the manipulator 34. (The transformation parameters are those held in the manipulator when the desired image is being displayed using the sub-system 33 of FIG. 3 and the system is reconfigured from its previous mode to its composition mode). High resolution transformed address data are output from the manipulator 34 to buffer 32 for the extraction of the high resolution foreground image 2'' from the storage device. The high resolution transformed address data ar also used to address the control image held in the low resolution stencil store. It will be appreciated that before the low resolution stencil store 8 can be addressed by the manipulator 34 the high resolution address data should be expressed in relation to the pixel positions in the lower resolution. This means that groups of high resolution addresses provided by the manipulator 34 will have the same integer address but different fractional addresses. The contributions made to each high resolution pixel from the address in the stencil store 8 depend on the respective fractional address and they are combined by the spatial interpolator 39. The up conversion is inherent in the process, being represented in FIG. 4 by the block 18.

As control data from the stencil store 8 is delivered to the high resolution spatial interpolator 39, corresponding high resolution foreground image data is delivered from buffer 32 to a high resolution spatial interpolator 40. As for the sub-system 33 of FIG. 3, the high resolution addresses derived by the manipulator 34 will not in general correspond exactly with integer addresses and accordingly a group of pixels surrounding a high resolution address from the manipulator 34 provides outputs from the buffer 32 and from the up converting circuitry 18 to respective spatial interpolators 39, 40. The spatial interpolators 39, 40 interpolate the groups of pixels from the up converting circuitry 18 and from the buffer 32 to derive respective single pixel values which are delivered to the once-only high resolution linear interpolator 20. The linear interpolator 20 also receives corresponding background image pixels from buffer 2a. The background image and the transformed and spatially interpolated foreground image are combined by the linear interpolator 20 in accordance with the transformed and spatially interpolated, up converted control image to produce a combined high resolution image on a pixel-by-pixel basis. The combined image is delivered via buffer 21 to the storage device 2.

Thus the above described second embodiment provides a system in which a first high resolution image can be modified by the overlaying or patching in of selected portions of a second high resolution image. Image modifications are displayed in real time using low resolution representation of the images on a low resolution monitor and, once the required image combination has been reached on the display monitor, the original first and second high resolution images can be combined in accordance with the displayed combination by up converting low resolution control image data to the high resolution of the first and second image.

Modifications to the above described embodiments of the invention may be apparent to those possessed of the appropriate skills. For example, whilst the two systems have been described with reference to whole images being extracted from the high resolution store, it is possible to arrange for a portion of a high resolution image to be extracted and modified by the user. This arrangement might be desirable in circumstances where detailed modifications are required to only a small portion of the image and such a feature could be accommodated by suitable modification to the manipulator shown and described in relation to FIGS. 3 and 4 of the drawings. By arranging for the display of a portion of the image it would be possible for the artist to see on the display monitor a magnified version of a detail of the image and to make modifications whilst working in this magnified scale to the displayed image and, subsequently, to the original image stored in the high capacity store device. Furthermore, each of the above described systems can be arranged to divide images into an array of sub-image portions or tiles and to manipulate and transfer only data relating to a tile in which a modification has been effected. Tiles will typically be 256×256 pixels although other sizes are of course possible. By use of the tiling feature, the speed at which the initial image held in the storage device is modified in accordance with modifications to the displayed image can be increased because modifications need only be made to the image data in the tiles which are affected. This also allows the system to make updating modifications to the initial high resolution image in accordance with modifications to the display intervals from time to time. For example updating modifications may be made each time the artist lifts the stylus from the touch tablet to take account of the most recent modifications. Tiling also facilitates panning or scrolling of displayed images where the initial image is for example a panoramic picture and the displayed image is only a portion of or window in that picture. By extracting all tiles which contribute to a window being displayed on the monitor at a given time and transferring these tiles to the buffer and by arranging for the up and down converters to be transparent, ie. arranging for the up and down converters to increase or reduce the resolution of the image data from the buffer by a factor of 1, portions of the image to be displayed can be transferred from the store to the buffer a window at a time and from there to the framestore for display. Guard areas can be defined in the initial image and used to indicate to the system when the window being displayed is moving near to an edge of the picture. Image tiles can then be extracted from the corresponding locations at the opposite edge of the picture to produce a wraparound effect in the displayed image.

The invention is intended to encompass all such modifications and is limited only by the scope defined by the appended claims.

We claim:

1. An electronic graphic system for use in modifying data defining an initial high resolution image, the system comprising:
    means and for data defining an initial high resolution image for supplying creating, from said initial high resolution data, data defining a low resolution representation of said initial image;
    means for creating user defined data representing a low resolution control image;
    means for supplying user selectable other image data;
    means for combining, at low resolution, said low resolution initial image data with said other image data in accordance with said low resolution control image data to produce data representing a low resolution combined image;
    display means for displaying said low resolution combined image;
    means for converting said low resolution control image data into high resolution control image data representative of said control image once desired modifications have been achieved by the user to the displayed image; and
    means for combining, at high resolution, said initial high resolution image data with said other image data in accordance with said high resolution control image data to produce data defining a modified high resolution image.

2. An electronic graphic system according to claim 1, further comprising a high capacity storage device for storing said initial high resolution image data.

3. An electronic graphic system according to claim 1, further comprising user operable control means provided for use in effecting said modifications, which user operable control means comprises input means for converting drawing actions of the user into data representative of said actions, which data is used to create said control image.

4. An electronic graphic system according to claim 3, wherein the low resolution combining means comprises a linear interpolator which uses the low resolution control image data as a coefficient to interpolate the low resolution initial image data and the other image data.

5. An electronic graphic system according to any one of claims 1 to 4, wherein the high resolution combining means comprises a linear interpolator which uses the high resolution control image data to interpolate the initial high resolution image data and the other image data.

6. An electronic graphic system according to any one of claims 1 to 4 in which said other image data comprises user defined color data.

7. An electronic graphic system according to any one of claims 1 to 4 in which said other image data comprises data defining a second initial high resolution image, the system further comprising means for creating a low resolution representation of said second image data which is combined by said low resolution combining means with said low resolution first image data for display by said display means.

8. An electronic graphic system according to claim 4, in which said other image data comprises data defining a second initial high resolution image, the system further comprising means for creating a low resolution representation of said second means with said low resolution first image data for display by said display means, and wherein the user operable control means further comprises low resolution transforming means for spatially transforming said low resolution other image data and said low resolution control data relative to said low resolution first image data.

9. An electronic graphic system according to claim 5, wherein the user operable control means further comprises low resolution transforming means for spatially transforming said low resolution other image data and said low resolution control data relative to said low resolution first image data, and further comprising high resolution transforming means for spatially transforming said high resolution other image data and said high resolution control data relative to said high resolution first image data.

10. An electronic graphic system according to any one of claims 1 to 4 including a control image framestore area and a first image framestore area, wherein the lower resolution control image data and the low resolution first image data are held respectively in said control image framestore area and said first image framestore area.

11. An electronic graphic system according to claim 7, including a control image framestore area and a first image framestore area and a second image framestore area, wherein the low resolution control image data and the low resolution fist image data are held respectively in said control image framestore area and said first image framestore area, and wherein said low resolution second image data is held in said second image framestore area.

12. An electronic graphic system according to claim 7, including a control image framestore area and a first image framestore area, wherein the low resolution control image data and the low resolution first image data are held respectively in said control image framestore area and said first image framestore area.

13. An electronic graphic system according to claim 5 in which said other image data comprises user defined color data.

14. An electronic graphic system according to claim 5, including a control image framestore area and a first image framestore area, wherein the low resolution control image data and the low resolution first image data are held respectively in said control image framestore area and said first image framestore area.

15. An electronic graphic system according to claim 5 in which said other image data comprises data defining a second initial high resolution image, the system further comprising means for creating a low resolution representation of said second image data which is combined by said low resolution combining means with said low resolution first image data for display by said display means.

16. An electronic graphic system according to claim 15, including a control image framestore area and a first image framestore area and a second image framestore area, wherein the low resolution control image data and the low resolution first image data are held respectively in said control image framestore area and said first image framestore area, and wherein said low resolution second image data is held in said second image framestore area.

17. An electronic graphic system according to claim 15, including a control image framestore area and a first image framestore area, wherein the low resolution control image data and the low resolution first image data are held respectively in said control image framestore area and said first image framestore area.

18. An electronic graphic system according to claim 6, including a control image framestore area and a first image framestore area, wherein the low resolution control image data and the low resolution first image data are held respectively in said control image framestore area and said first image framestore area.

19. An electronic graphic system according to claim 8, including a control image framestore area and a first image framestore area, wherein the low resolution control image data and the low resolution first image data are held respectively in said control image framestore area and said first image framestore area.

20. An electronic graphic system according to claim 9, including a control image framestore area and a first image framestore area, wherein the low resolution control image data and the low resolution first image data are held respectively in said control image framestore area and said first image framestore area.

21. An electronic graphic system comprising:
first storage means having the capacity to store first pixel data defining an image of high resolution;
down converting means for deriving second pixel data from said first pixel data and defining said image with a lower resolution;
second storage means having the capacity to store said second pixel data;
control input means for providing third pixel data defining a control image of said lower resolution;
user operable means responsive to said third pixel data for deriving a series of trial image compositions including at least pixel data derived from said second storage means;
means for displaying said trial compositions as they are derived;
up converting means or deriving fourth pixel data form said third pixel data to define said control image with said high resolution;
image composition means responsive to said fourth pixel data for deriving an image composition including at least pixel data derived from said first storage means and corresponding to a selected one of said trial image compositions.

22. A method of electronically processing data defining an initial high resolution image to produce a modified high resolution image, the method comprising:

supplying data defining an initial high resolution image;

creating, from said data defining said initial high resolution image, data defining a low resolution representation of said initial image;

creating data defining a low resolution control image;

supplying other image data;

combining, at low resolution, said low resolution initial image data with said other image data in accordance with said low resolution control image data to produce data representing a low resolution combined image;

displaying said low resolution combined image;

converting said low resolution control image data into high resolution control image data representative of said control image once desired modifications have been achieved to the displayed image; and combining, at high resolution, said initial high resolution image data with said other image data in accordance with said high resolution control image data to produce data defining a modified high resolution image.

* * * * *

UNITED STATES PATENT AND TRADEMARK OFFICE
CERTIFICATE OF CORRECTION

PATENT NO. : 5,142,616

DATED : August 25, 1992

INVENTOR(S) : Paul R. N. Kellar, et al.

It is certified that error appears in the above-identified patent and that said Letters Patent is hereby corrected as shown below:

Title page, left-hand column, at item "[19]", "Kellas et al." should read --Kellar et al.--.

Title page, left-hand column, at item "[75]", "Paul R. N. Kellas" should read --Paul R. N. Kellar--.

UNITED STATES PATENT AND TRADEMARK OFFICE
CERTIFICATE OF CORRECTION

PATENT NO. : 5,142,616
DATED : August 25, 1992
INVENTOR(S) : Paul R.N. Kellar, et al.

It is certified that error appears in the above-identified patent and that said Letters Patent is hereby corrected as shown below:

Column 10, line 21, change "$S_{i=1}$" to -- $S_{i-1}$ --;

Column 12, line 21, change "EP-A-2,245,943" to -- EP-A-0,245,943 --;

Column 18, line 30, change "and for" to -- for supplying --; and
line 31, change "for supplying" to --and for --.

Signed and Sealed this

Eleventh Day of October, 1994

Attest:

BRUCE LEHMAN

Attesting Officer

Commissioner of Patents and Trademarks